US011906448B2

(12) United States Patent
Gautsch et al.

(10) Patent No.: US 11,906,448 B2
(45) Date of Patent: Feb. 20, 2024

(54) X-RAY DEVICE HAVING MULTIPLE BEAM PATHS

(71) Applicant: ANTON PAAR GMBH, Graz (AT)

(72) Inventors: Josef Gautsch, Graz (AT); Roman Prischnegg, Mooskirchen (AT)

(73) Assignee: ANTON PAAR GMBH, Graz (AT)

( * ) Notice: Subject to any disclaimer, the term of this patent is extended or adjusted under 35 U.S.C. 154(b) by 0 days.

(21) Appl. No.: 17/755,041

(22) PCT Filed: Aug. 21, 2020

(86) PCT No.: PCT/EP2020/073458
§ 371 (c)(1),
(2) Date: Apr. 19, 2022

(87) PCT Pub. No.: WO2021/078424
PCT Pub. Date: Apr. 29, 2021

(65) Prior Publication Data
US 2022/0381709 A1    Dec. 1, 2022

(30) Foreign Application Priority Data

Oct. 21, 2019  (AT) .............................. A 50904/2019

(51) Int. Cl.
*G01N 23/20016* (2018.01)
*G01N 23/207* (2018.01)
(Continued)

(52) U.S. Cl.
CPC ..... *G01N 23/20016* (2013.01); *G01N 23/207* (2013.01); *G21K 1/02* (2013.01); *G21K 1/06* (2013.01)

(58) Field of Classification Search
CPC ........... G01N 23/20016; G01N 23/207; G01N 23/20; G21K 1/02; G21K 1/06; G21K 2201/06; G21K 2201/0067
See application file for complete search history.

(56) References Cited

U.S. PATENT DOCUMENTS

| 4,446,568 A | 5/1984 | Williams et al. |
| 6,990,177 B2 | 1/2006 | Fujinawa et al. |

(Continued)

FOREIGN PATENT DOCUMENTS

| DE | 101 41 958 A1 | 4/2003 |
| DE | 10 2009 047 672 B4 | 9/2012 |

(Continued)

OTHER PUBLICATIONS

Translation of WO 9522758 A1 (Year: 1995).*

(Continued)

*Primary Examiner* — David P Porta
*Assistant Examiner* — Mamadou Faye
(74) *Attorney, Agent, or Firm* — Lewis Roca Rothgerber Christie LLP

(57) ABSTRACT

An X-ray beam generating system including an X-ray source for generating an original primary X-ray beam, an optics system including a first optics component and at least one second optics component which are movable relative to the X-ray source in order either to bring the first optics component into interaction with the original primary X-ray beam, whereupon a first primary X-ray beam is generated which is deflected at a first deflection angle, or to bring the second optics component into interaction with the original primary X-ray beam, whereupon a second primary X-ray beam is generated which is deflected at a second deflection angle, and a rotating device to rotate the X-ray beam generating system through either a first rotation angle or a second rotation angle to allow either the first primary X-ray beam or the second primary X-ray beam to impinge on a sample region.

19 Claims, 4 Drawing Sheets

(51) Int. Cl.
*G21K 1/02* (2006.01)
*G21K 1/06* (2006.01)

(56) References Cited

U.S. PATENT DOCUMENTS

| | | |
|---|---|---|
| 7,035,377 B2 | 4/2006 | Katayama |
| 7,551,719 B2 | 6/2009 | Yokhin et al. |
| 2003/0043965 A1 | 3/2003 | Bahr et al. |
| 2003/0123610 A1 | 7/2003 | Okanda et al. |
| 2004/0066903 A1 | 4/2004 | Fujinawa et al. |
| 2007/0178324 A1* | 8/2007 | Masuda ............... B29C 48/08 428/500 |
| 2008/0175352 A1 | 7/2008 | Kogan |
| 2008/0273662 A1* | 11/2008 | Yun ..................... G03F 7/70625 378/74 |
| 2009/0232276 A1* | 9/2009 | Kogan ................... G01N 23/20 378/53 |
| 2011/0135059 A1 | 6/2011 | Ollinger |
| 2012/0051518 A1* | 3/2012 | Omote ................... G21K 1/06 378/86 |
| 2013/0287178 A1 | 10/2013 | Ryan et al. |
| 2015/0098547 A1* | 4/2015 | Wakasaya ............... G21K 1/00 378/91 |
| 2017/0176356 A1 | 6/2017 | Hoffman et al. |
| 2017/0336334 A1 | 11/2017 | Yun et al. |
| 2019/0011379 A1 | 1/2019 | Yun et al. |
| 2019/0094160 A1* | 3/2019 | Sunder ............ G01N 23/20016 |

FOREIGN PATENT DOCUMENTS

| | | |
|---|---|---|
| DE | 10 2015 226 101 A1 | 6/2017 |
| EP | 1 947 448 A1 | 7/2008 |
| EP | 1 396 716 B1 | 7/2012 |
| EP | 1 324 023 B1 | 9/2012 |
| EP | 3 190 593 A2 | 7/2017 |
| JP | 6-249801 A | 9/1994 |
| WO | WO-9522758 A1 * | 8/1995 ............ B82Y 10/00 |
| WO | WO 2018/175570 A1 | 9/2018 |

OTHER PUBLICATIONS

International Search Report of PCT/EP2020/073458, dated Nov. 5, 2020, 7 pages.
International Written Opinion of PCT/EP2020/073458, dated Nov. 5, 2020, 9 pages.
Austrian Office Action of A 50904/2019-2, dated Apr. 22, 2020, 3 pages.

* cited by examiner

X-RAY DEVICE HAVING MULTIPLE BEAM PATHS

CROSS-REFERENCE TO RELATED APPLICATIONS

This application is the U.S. national phase of International Application No. PCT/EP2020/073458 filed 21 Aug. 2020 which designated the U.S. and claims priority to Austrian Patent Application No. A50904/2019 filed 21 Oct. 2019, the entire contents of each of which are hereby incorporated herein by reference.

FIELD OF INVENTION

Embodiments of the present invention relates to a device and a method for X-ray examination of a sample, wherein different beam paths can be selected.

TECHNICAL BACKGROUND

The document DE 10 2015 226 101 A1 discloses an X-ray optics assembly for an X-ray diffractometer, wherein different beam paths for the X-ray beam can be selected. Optionally, an aperture system or a monochromator can be moved into the beam path.

The document DE 10 2009 047 672 B4 discloses an X-ray optical set-up with two focusing elements, wherein one of two X-ray beams can be selected by rotating a slotted aperture block.

The document EP 1 324 023 B1 discloses an X-ray diffraction apparatus with different beam paths for a divergent X-ray beam and a parallel X-ray beam. By means of a slit device, one of the two X-ray beams is selectable.

The document US 2015/098547 A1 discloses an X-ray optical component device. An X-ray source can be rotated relative to a detector.

The document EP 1 396 716 B1 discloses an X-ray optical system for small angle scattering measurements, whereby a specific X-ray beam can be selected by means of slits, which are rotatable.

The document US 2017/336334 A1 discloses an X-ray transmission spectrometer system. Various optics can be laterally shifted to selectively line them up with one of various anode target regions of the X-ray source.

The document DE 10141958 64 discloses an X-ray diffractometer comprising an X-ray source and a goniometer for sequential adjustment of successive relative angular positions between X-ray source, sample and an X-ray detector. The X-ray radiation may be guided from a position 1 to a position 2 by different switchable beam paths fixedly adjusted between the position 1 and position 2. The switching between the different beam paths is effected by a relative rotation of a unit, which is formed by the different beam paths. X-rays emitted by the X-ray source at different angles are used for the different beam paths.

The document U.S. Pat. No. 7,035,377 62 discloses an X-ray beam generator and an adjusting method, wherein an anti-cathode has a plurality of anti-cathode parts with different materials which can be switched to subject them to electron bombardment. An optical element in the beam path can be tilted to generate different X-rays, which are generated when the different anti-cathode parts are bombarded by means of the optical element at different rotation angles.

The document U.S. Pat. No. 7,551,719 62 discloses an X-ray zoom lens for small angle X-ray scattering. X-rays emitted from an X-ray beam interact with an optical element and pass through a beam selection system comprising shiftable plates.

However, conventional X-ray examination devices, which allow the selection of different beam paths, have various disadvantages. In particular, the intensity or brilliance of the various X-rays along the different beam paths is not of sufficient or desired magnitude or quality in all cases.

Thus, there may be a need to provide a device and a method for X-ray examination of a sample, wherein a selection of X-rays or X-ray beam paths of different characteristics for interaction with the sample is enabled, while further the brilliance, intensity, performance and/or flexibility are improved. Furthermore, such a device or method shall be simplified with respect to manageability, in particular allowing an automated mode of operation.

SUMMARY OF THE INVENTION

This need may be met by the subject matter of the independent claims. The dependent claims specify particular embodiments of the present invention.

According to an embodiment of the present invention, there is provided a device for X-ray examination of a sample, the device comprising: an X-ray beam generating system comprising: an X-ray source for generating an original primary X-ray beam; an optics system (optical system) having a first and at least one second optics components (optical components) which are movable relative to the X-ray source in order either to bring the first optics component into interaction with the original primary X-ray beam, whereupon a first primary X-ray beam is generated which is deflected at a first deflection angle, or to bring the second optics component into interaction with the original primary X-ray beam, whereupon a second primary X-ray beam is generated which is deflected at a second deflection angle; and a rotating device having a rotating stage (rotation stage, rotary stage) on which the X-ray beam generating system is mounted in order to rotate the X-ray beam generating system through either a first rotation angle or a second rotation angle about a rotating stage axis in order to allow (cause) either the first primary X-ray beam or the second primary X-ray beam to impinge on a sample region (sample area).

In particular embodiments, the optics system may also be moved such that no optics component interacts with the original primary x-ray beam and the original primary x-ray beam passes through the optics system undeflected without interaction with any of the optics components. In this case, the deflection angle is zero and the rotation angle can be set to a pre-known preset rotation angle.

The sample can be an (at least partially) crystalline sample, in particular a monocrystalline sample, a polycrystalline sample or an amorphous sample. The sample may be chemically and/or structurally homogeneous or inhomogeneous. The sample may be powdery, liquid or gaseous. In particular, the sample may be a solid sample or solid material sample. In particular, the sample may be planar (two-dimensional) in extent. For example, it may be deposited on a planar or flat substrate as a thin layer of a few micrometers. By irradiating the sample with the first primary X-ray beam or the second primary X-ray beam, respective secondary X-ray radiation is emitted from the sample, which is caused by elastic interaction, in particular diffraction, at the material or materials of the sample. The energy or wavelength of the secondary X-ray radiation is equal to the energy or wavelength of the respective primary X-ray radiation.

The original primary X-ray beam (and, as a result, the first primary X-ray beam and the second primary X-ray beam, respectively) may comprise monochromatic X-rays or polychromatic X-rays (for example, in an energy range of 4.5 key to 22 key). The device may be configured to acquire and analyze X-ray data comprising X-ray scattering data for different scattering angles (diffraction angles) and/or different energies or wavelengths. The X-ray source may include a cathode for generating the original primary X-ray beam, from which electrons are accelerated toward an anode. When the electrons impact the anode of the X-ray source, the original primary X-ray beam is generated, which may comprise continuous retardation radiation (at different energies) and also one or more characteristic X-rays. X-rays may emanate from the anode of the X-ray source at different angles. By means of an aperture diaphragm (aperture stop), a specific angular range of the X-rays emanating from the anode may be selected as the original primary X-ray beam. The aperture diaphragm may be fixed or movable relative to the anode of the X-ray source. As a result, an original primary X-ray beam of a certain intensity or brilliance may have been generated. To generate the first or second primary X-ray beam, the aperture diaphragm of the X-ray source does not need to be changed in its position or aperture width. In other embodiments, the position and/or the aperture width of the optional aperture diaphragm of the X-ray source may take different positions for generating the first primary X-ray beam and the second primary X-ray beam, respectively.

The optics system may include at least two optics components or even more optics components, such as three, four, five, six, or between two and ten optics components. The optics components may be arranged in a stack or in a row, and the optics components may be movable along a stacking direction to bring a desired optics component (or no single optics component) into interaction with the original primary X-ray beam at a time. Each optics component may be designed to generate the respective (first or second or still further) primary X-ray beam upon interaction with the original primary X-ray beam by elastic interaction, in particular diffraction, which may each have a specific characteristic with respect to brilliance and/or intensity and/or divergence and/or wavelength, etc. By being able to generate a first primary X-ray beam and at least one second primary X-ray beam, it is possible to analyze the sample with great flexibility. Alternatively, it is possible to analyze different samples by the different primary X-ray beams.

The first or second deflection angle may be defined as an angle included between the original (mean) primary X-ray beam and the first or second (mean) primary X-ray beam, respectively. The first and second optics components thus generate first and second primary X-ray beams, respectively, that are deflected at different angles (relative to the original primary X-ray beam), The characteristics (for example, in terms of included wavelengths or energies, in terms of divergence or convergence, or parallelism) of the first and second primary X-ray beams, respectively, may be different.

Both the X-ray source and the optics system (as parts of the X-ray beam generating system) are mounted on the rotating stage (in a fixed arrangement and orientation relative to each other). Thus, when the rotating stage is rotated, both the X-ray source and the entire optics system are rotated. The first rotation angle may be defined as a function of, or depending on, the first deflection angle.

The second rotation angle may be defined as a function of, or depending on, the second deflection angle. The first or second rotation angle may be given or calculated, for example, as a sum or a difference of the first or second deflection angle with a reference angle. For example, the rotating stage may be rotated by a defined angle by means of an electric motor (for example, a stepper motor). The rotation of the rotating stage may be automated once a particular optics component (for example, the first or the second optics component) has been moved so as to interact with the original primary X-ray beam. Each optics component of the optics system may be assigned a specific rotation angle by which the rotating stage must be rotated in order to allow the primary X-ray beam generated by the respective optics component to impinge on the sample region.

For example, the rotating stage may have mounting areas for mounting the X-ray source and the optics system. The optics system does not need to be rotatable relative to the X-ray source. Due to the rotatability of the rotating stage, it is possible to generate different primary X-ray beams by moving the optics components that are brought into interaction with the original primary X-ray beam without requiring different original primary X-ray beams to emanate from an anode of the X-ray source at different angular ranges. Thus, the brilliance or intensity of the respective primary X-ray beams of the different characteristics may be improved compared to conventional systems or may be selectable (for example, by suitable adjustment of an aperture exit aperture of the X-ray source).

The device can be designed for X-ray diffractometry or X-ray diffraction on the sample. In particular, the sample may be examined quantitatively with respect to its phase composition (for example, proportions of different crystal types within the sample of one or more materials). Conventional X-ray examination devices have the disadvantage that the beam paths formed in each case emerge from the X-ray source at different exit angles. Thus, conventionally, an optimal or desired exit angle cannot be fixed for all beam paths in order to select the different beam paths with different characteristics of the X-ray radiation. This disadvantage is eliminated by embodiments of the present invention.

According to an embodiment of the present invention, there is provided a setup for X-ray examination comprising an X-ray source, a (preferably linearly) adjustable magazine with at least two optical elements, and a (for example linearly) adjustable adjustment gap. These components may form a fixedly connected unit and may all be located together on a rotating arm (for example, the rotating stage) which sits on the actual goniometer arm for the X-ray source and is rotatable relative thereto.

According to an embodiment of the present invention, the rotating stage axis is aligned parallel to a goniometer axis and the sample region is located at the goniometer axis. In particular, both the first primary X-ray beam and the second primary X-ray beam (when the rotating stage is appropriately rotated) may be precisely or substantially aligned with the goniometer axis. If the first or the second primary X-ray beam is directed precisely to the goniometer axis, a diffraction angle (also referred to as 2θ), i.e., a deflection of a secondary beam from the direction of the first or the second primary X-ray beam, can be precisely determined. This enables reliable recording of secondary X-rays emanating from the sample at different deflection angles. The rotating stage axis may further be parallel to a deflection axis about which the first primary X-ray beam or the second primary X-ray beam is deflected relative to the original primary X-ray beam. The first primary X-ray beam or the second primary X-ray beam may be directed precisely to the sample region by rotating the rotating stage. The deflection of the original primary X-ray beam by the respective optics component may thus be compensated for by suitable rotation of the rotating stage so as to direct the respectively generated primary X-ray beam onto the sample region for all optics components of the optics system.

According to an embodiment of the present invention, the rotating stage axis is arranged offset from the goniometer axis, in particular arranged between the X-ray beam generating system and the goniometer axis. Thus, the device may be implemented in a simple manner. In other embodiments, the rotating stage axis may coincide exactly or substantially exactly with the goniometer axis. Thus, in an even more accurate manner, for example, a Bragg-Brentano geometry may be maintained at various rotation (torsion) angles of the rotating stage.

According to an embodiment of the present invention, a distance between the X-ray source, in particular an electron target region on its anode, and the rotating stage axis is between 0.5 and 0.9 times, in particular between 0.6 and 0.8 times, a distance between the goniometer axis and the X-ray source, in particular an electron target region on its anode. When the rotating stage is rotated about the rotating stage axis, the distance between the electron target region and the goniometer axis thus changes only minimally. Thus, at different rotation angles of the rotating stage, for example, a Bragg-Brentano geometry is always fulfilled with the smallest deviations. Thus, for example, the diffraction angle can be precisely determined.

According to an embodiment of the present invention, a deflection axis about which the first primary X-ray beam or the second primary X-ray beam is deflected relative to the original primary X-ray beam by the first deflection angle or the second deflection angle, respectively, is parallel to the rotating stage axis. Thus, the deflection of the original primary X-ray beam due to the interaction with the first optics component or the second optics component may be compensated by the rotation of the rotating stage about the rotating stage axis in such a way that the respectively generated first or second primary X-ray beam impinges exactly on the sample region. In particular, all three axes, i.e. the rotating stage axis, the goniometer axis and the deflection axis, about which the first or the second primary X-ray beam is deflected relative to the original primary X-ray beam, may be parallel to each other (or at least within error tolerances of less than, for example, 3°).

According to an embodiment of the present invention, the device further comprises: an X-ray detector; a goniometer having a first arm and a second arm, at least one of the first arm and the second arm being pivotable about the goniometer axis, the first arm having mounted thereon the rotating stage having the X-ray beam generating system, and the second arm having mounted thereon the X-ray detector. The X-ray detector is constructed and arranged to detect secondary X-rays emanating from the sample when struck by the first and second primary X-rays, respectively. The X-ray detector may comprise, for example, a point detector (having, for example, a single X-ray sensitive sensor element), also referred to as a zero-dimensional detector. By means of the goniometer, a detection scattering angle ($2\theta$) may be set to detect secondary X-rays with respect to their intensity, the direction of which differs from the directions (in particular, with a fixed goniometer setting) of the first and second primary X-rays, respectively, by the detection scattering angle due to interaction with the sample.

An angular detection area of the X-ray detector may comprise or cover the sample region, in particular an area around the goniometer axis. Thus, secondary X-rays emanating from the goniometer axis or an area around it are detectable by the X-ray detector. In particular, the X-ray detector may be an energy-resolving X-ray detector, in particular a point detector, which is configured to detect secondary X-ray radiation in an energy-resolved manner. The X-ray detector may thus be configured to detect intensities of secondary X-rays of different energies. By means of the goniometer, an angle of incidence of the respective primary X-ray beam on the sample may be adjusted by pivoting the first arm. In other embodiments, the X-ray detector may be a one-dimensional (line) detector or a two-dimensional (area) detector. By pivoting the second arm of the goniometer, an angle of reflection (angle of emergence, emergent angle) of the secondary radiation relative to the sample may be adjusted. The sum of the angle of incidence and the angle of reflection gives the diffraction angle or scattering angle $2\theta$. In particular, to acquire X-ray scattering data, both the first arm and the second arm may be pivoted in opposite directions to change both the angle of incidence and the angle of reflection. By means of pivoting the first arm, the entire rotating stage on which the X-ray beam generating system is mounted is pivoted about the goniometer axis. This enables diffraction angle dependent acquisition of secondary X-rays.

According to an embodiment of the present invention, at least one of the optics components is configured to generate from the original primary X-ray beam a monochromatic or polychromatic primary X-ray beam that is parallel or divergent or focusing (convergent) or collimating. In general, one or more of the optics components may be configured to change the characteristics of the original primary X-ray beam with respect to the distribution of energies or wavelengths and/or with respect to divergence or convergence or parallelism. This makes it possible to direct primary X-rays of different characteristics to the sample in order to be able to examine it in different ways or to be able to examine different samples in an improved way by different primary X-ray beams of different characteristics. A parallel primary X-ray beam may comprise a plurality of partial beams (sub-beams), each of which is parallel to the other. A divergent primary X-ray beam may comprise a plurality of partial primary X-ray beams diverging in the direction of progression in a plurality of directions within a cone. A focusing or collimating or converging primary X-ray beam may comprise a plurality of partial primary X-ray beams converging in a cone or taper in the direction of progression to a point or region. In particular, the partial primary X-ray beams may be focused on the sample region or the goniometer axis. This allows for a variety of examination options.

According to an embodiment of the present invention, at least one of the optics components comprises: a collimating x-ray mirror, a focusing x-ray mirror, a multilayer x-ray mirror; a multilayer monochromator; a single crystal optics, a 1D mirror, a 2D mirror. Thus, conventionally available optics components are supported by the device and may be used by the device. Depending on the application, the optics components may be suitably selected and suitably arranged in a stack, for example.

According to an embodiment of the present invention, the optics components of the optics system are movable relative to the X-ray source in a linear and/or substantially perpendicular manner to the original primary X-ray beam. In this regard, the optics components may be arranged such that when a particular optics component, for example the first optics component, is arranged to interact with the original primary X-ray beam, all other optics components are shadowed or blocked from interaction with the original primary X-ray beam. Further blocking apertures may thus be dispensable.

In other words, the optics magazine may be arranged by linear displacement so that the radiation arriving above and/or below the respective optics component is covered or blocked by the other optics components arranged above and/or below. This eliminates the need for a movable slot or gap to selectively select one path and shield the other.

For example, a magnitude of the possible deflection angles due to the different optics components may be between 0° and 20°, or in particular between 0° and 10°.

According to an embodiment of the present invention, the optics system comprises a carriage (sled, slide) mounted on the rotating stage and displaceable relative to the X-ray source, on which carriage the optics components are mounted, the carriage being arranged in particular on a rail and displaceable relative to the rail. This enables a simple design or implementation for linear displacement of the optics components. The carriage may be moved, for example, by means of an electric motor which, for example, moves a toothed rail which is connected to the carriage. Other moving implementations are possible.

According to an embodiment of the present invention, the first optics component and the second optics component are alternatively (selectively) movable such that the original primary X-ray beam exits the X-ray source and impinges on the first optics component and the second optics component, respectively, in each case at the same optimal or desired angular range relative to an electron target region on the anode of the X-ray source. Thus, one and the same original primary X-ray beam may be used (with respect to its characteristics, e.g., intensity and/or brilliance) to generate both (by means of interaction at the first optics component) the first primary X-ray beam and (by means of interaction at the second optics component) the second primary X-ray beam. In particular, this allows a desired high intensity or a desired brilliance of both the first primary X-ray beam and the second primary X-ray beam to be obtained. Conventionally, different portions of a primary X-ray beam radiating in a wide angular range were used to generate different downstream generated primary X-ray beams. This also required adjustment of the different portions of the primary X-ray beam. Embodiments of the present invention avoid the need to adjust multiple portions of a primary x-ray beam emanating from the x-ray source. It is sufficient to adjust a single original primary X-ray beam with respect to, for example, its intensity, brilliance, and divergence or cross-sectional area in order to generate both the first and second primary X-ray beams by means of interaction at the first and second optics components, respectively.

According to an embodiment of the present invention, at least one of the optics components is rotatable about an optics rotation axis parallel to the rotating stage axis. Rotation of at least one of the optics components may further allow the characteristics of the primary X-ray beam generated by that optics component to be adjusted or changed as desired. This provides further flexibility for performing X-ray examination experiments. The rotation angles of the rotating stage may further be adjusted depending on the optional rotation of the at least one optics component or of the entire optics system, in particular in an automated manner.

According to an embodiment of the present invention, the original primary X-ray beam is not deflected after (downstream) an exit from the X-ray source and before (upstream) entry into the optics system. Thus, no optics components need to be arranged in the region downstream of the X-ray source and upstream of the optics system. This may further simplify the device and reduce absorption.

According to an embodiment of the present invention, the device further comprises: an aperture diaphragm, substantially perpendicular to the first and/or second primary X-ray beam, variable with respect to aperture position and/or aperture size, in particular adjustable in height and/or width, mounted on the rotating stage downstream of the optics system, in particular arranged between the optics system and the rotating stage axis. The aperture diaphragm allows adjustment of the cross-sectional size and/or cross-sectional shape of the respective primary X-ray beam downstream of the aperture diaphragm and upstream of the sample region, Depending on which optics component is brought into interaction with the original primary X-ray beam, the aperture diaphragm may be adjusted with respect to aperture position and/or aperture size. In other embodiments, both aperture position and/or aperture size are chosen to be the same for different optics components. This allows greater flexibility with regard to the characteristics of the respective primary X-ray beam.

According to an embodiment of the present invention, the original primary X-ray beam is generated by bombarding a single electron target region on an anode of the X-ray source in order to generate both the first and second primary X-ray beams from the original primary X-ray beam when the first optics component and the second optics component, respectively, is struck (impinged) by the original primary X-ray beam, Electrons emitted from a cathode may be accelerated to the electron target region by a high voltage. The anode may have a planar section in the electron target region. The original primary X-ray beam may emanate from this planar section (e.g., as a beam bundle) at various angles of reflection (emergent angles). The above-mentioned optional aperture diaphragm of the X-ray source may select (allow to emerge) a specific emergent angle range of the X-rays emanating from the anode to form the original primary X-ray beam. The emergent angle range may be selected depending on the application, in particular in order to obtain the highest (lowest) possible intensity or, for example, a high (low) brilliance of the original primary X-ray beam. The characteristic of the original primary X-ray beam may thus be the same for the generation of the first primary X-ray beam and the second primary X-ray beam, Thus, for example, a higher intensity or a higher brilliance of both the first primary X-ray beam and the second primary X-ray beam may selectively be achieved than it was achievable in the prior art for different X-ray beams of different characteristics.

According to an embodiment of the present invention, the X-ray source, in particular the electron target region on its anode, the X-ray detector and the sample region are arranged substantially in Bragg-Brentano geometry. In this regard, a distance of the anode of the X-ray source from the goniometer axis may be equal to the distance between the entrance window of the detector and the goniometer axis, except for an error tolerance. Furthermore, if the distance between the rotating stage axis and the goniometer axis is relatively small compared to this distance (radius) between the anode of the X-ray source and the goniometer axis, the Bragg-Brentano geometry is hardly changed when the rotating stage is rotated about the rotating stage axis, at least within a range of rotation angle that lies, for example, between 0° and 10° or between 0° and 5°. This allows adjustment errors to be reduced.

According to an embodiment of the present invention, the device further comprises a controller configured to adjust a rotation angle of the rotating stage depending on a traveling distance (travel distance, traverse path) of the optics components. The controller may alternatively or additionally be configured to adjust the rotation angle of the rotating stage depending on that optics component which is brought into interaction with the original primary X-ray beam. This allows an automated switching between different primary X-ray beams in an automated manner.

The device may further include a sample holder configured to hold the sample in the sample region. In particular, the sample may be applied two-dimensionally to a flat (planar) substrate so that the sample ideally has an area in common with the goniometer axis.

It should be understood that features which are mentioned, described or provided, individually or in any combination, in connection with a device for X-ray examination are equally applicable, individually or in any combination, to a method of X-ray examination of a sample, according to embodiments of the present invention and vice versa.

According to an embodiment of the present invention, there is provided a method of an X-ray examination of a sample, the method comprising: generating an original primary X-ray beam by means of an X-ray source of an X-ray beam generating system further comprising an optics system having a first optics component and at least one second optics component movable relative to the X-ray source; bringing the first optics component of the optics system into interaction with the original primary X-ray beam to generate a first primary X-ray beam deflected at a first deflection angle, wherein a rotating device comprises a rotating stage on which the X-ray beam generating system is mounted and which is adjusted at a first rotation angle to allow the first primary X-ray beam to impinge on a sample region; and in particular acquiring (determining) first diffraction data.

Further, the X-ray examination method may comprise: moving the first optics component and the second optics component of the optics system relative to the X-ray source to bring the second optics component into interaction with the original primary X-ray beam to generate a second primary X-ray beam deflected at a second deflection angle; and rotating the rotating stage to a second rotation angle about a rotating stage axis to allow the second primary X-ray beam to impinge on the sample region; and in particular, acquiring second diffraction data.

Both the acquisition of the first diffraction data and the acquisition of the second diffraction data may further comprise pivoting the X-ray detector and/or the X-ray source by pivoting the first arm and/or the second arm of the goniometer to detect secondary X-rays by the X-ray detector which emanate from the sample at different diffraction angles (2θ).

DETAILED DESCRIPTION OF EMBODIMENTS

Elements identical in structure and/or function are depicted in the figures with similar reference signs, differing at most in the first digit.

Figure 1:
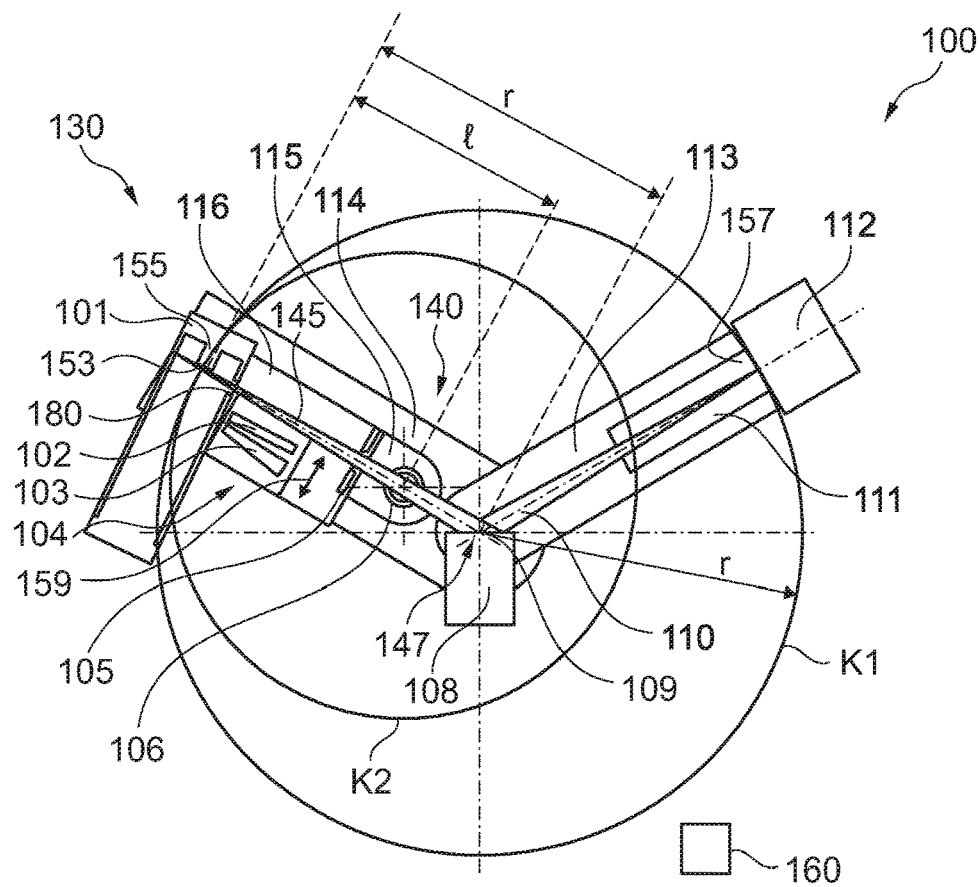
FIG. 1 schematically illustrates a device for X-ray examination of a sample according to an embodiment of the present invention.

The device 100 schematically illustrated in FIG. 1 for X-ray examination of a sample (not shown) supported on a sample carrier 108 comprises an X-ray beam generating system 130 and a rotating device 140. The X-ray beam generating system 130 comprises an X-ray source 101 for generating an original primary X-ray beam 145 and an optics system 104 (in an X-ray optics housing 116) having a first optics component 102 and at least one second optics component 103 which are movable relative to the X-ray source 101. This enables either to bring the first optics component 102 into interaction with the original primary X-ray beam 145, whereupon a first primary X-ray beam 117 (illustrated in FIG. 2) is generated, which is deflected at a first deflection angle α1 (relative to the original primary X-ray beam 145), or to bring the second optics component 103 into interaction with the original primary X-ray beam 145, whereupon a second primary X-ray beam 118 (illustrated in FIG. 3) is generated, which is deflected at a second angle α2 relative to the original primary X-ray beam 145.

The rotating device 140 comprises a rotating stage 115 on which the X-ray beam generating system 130 is mounted in order to rotate the X-ray beam generating system 130 through either a first rotation angle β1 or a second rotation angle β2 (see FIG. 2 and FIG. 3) about a rotating stage axis 106 in order to allow either the first primary X-ray beam 117 or the second primary X-ray beam 118 to impinge on a sample region 147 (on the sample support 108). The rotating stage axis 106 is arranged and oriented perpendicular to the drawing plane. In this regard, the first and second deflection angles α1, α2, respectively, are defined as the angle by which the first and second primary X-ray beams 117, 118, respectively, are deflected with respect to the original primary X-ray beam 145, The first and second rotation angles β1, β2, respectively, are defined as the angle between a central axis 149 of a first goniometer arm 114 and a central axis 151 (see FIGS. 2, 3, 4) of the rotating stage 115.

A goniometer of the device 100 comprises the first goniometer arm 114 and a second goniometer arm 113, wherein the first goniometer arm 114 and the second goniometer arm 113 are pivotable about a goniometer axis 109. The goniometer axis 109 is arranged and oriented perpendicular to the drawing plane. In this regard, the rotating stage 115 with the X-ray beam generating system 130 is mounted on the first goniometer arm 114 and an X-ray detector 112 is mounted on the second goniometer arm 113. The rotating stage axis 106 is arranged parallel to the goniometer axis 109 and the sample region 147 is located at the goniometer axis 109. The rotating stage axis 106 is arranged offset from the goniometer axis 109, and is located between the X-ray beam generating system 130 and the goniometer axis 109.

The x-ray source 101 comprises an anode 155 having an electron target region 153 on the anode, A non-illustrated cathode emits electrons that are accelerated to and impinge on the electron target region 153 on the anode 155, A distance l (see FIG. 1) between the electron target region 153 on the anode 155 of the X-ray source 101 and the rotating stage axis 106 is between 0.5 and 0.9 times a distance r between the goniometer axis 109 and the electron target region 153 of the anode 155 of the X-ray source 101. Also, a detector entrance region 157 of the detector 112 is spaced apart from the goniometer axis 109 by the distance r. Thus, the X-ray source 101, the X-ray detector 112, and the sample region 147 are arranged in the Bragg-Brentano geometry.

The optics components 102, 103 (and optionally other optics components of the optics system 104) are linearly movable relative to the X-ray source 101 along the arrows 159 substantially perpendicular to the original primary X-ray beam 145. As shown in FIGS. 1, 2, 3, 4, 5, 6, the original primary X-ray beam 145 is not deflected or otherwise altered or affected by any other optics component downstream of the exit from the X-ray source 101 and upstream of the optics system 104.

For example, as illustrated in FIG. 1, the device 100 further comprises an aperture diaphragm 105 that is variable with respect to aperture position and/or aperture size substantially perpendicular to the first and/or second primary X-ray beams 117 and 118, respectively. The aperture diaphragm 105 is mounted downstream of the optics system 104, in particular between the optics system 104 and the rotating stage axis 106.

Figure 2:
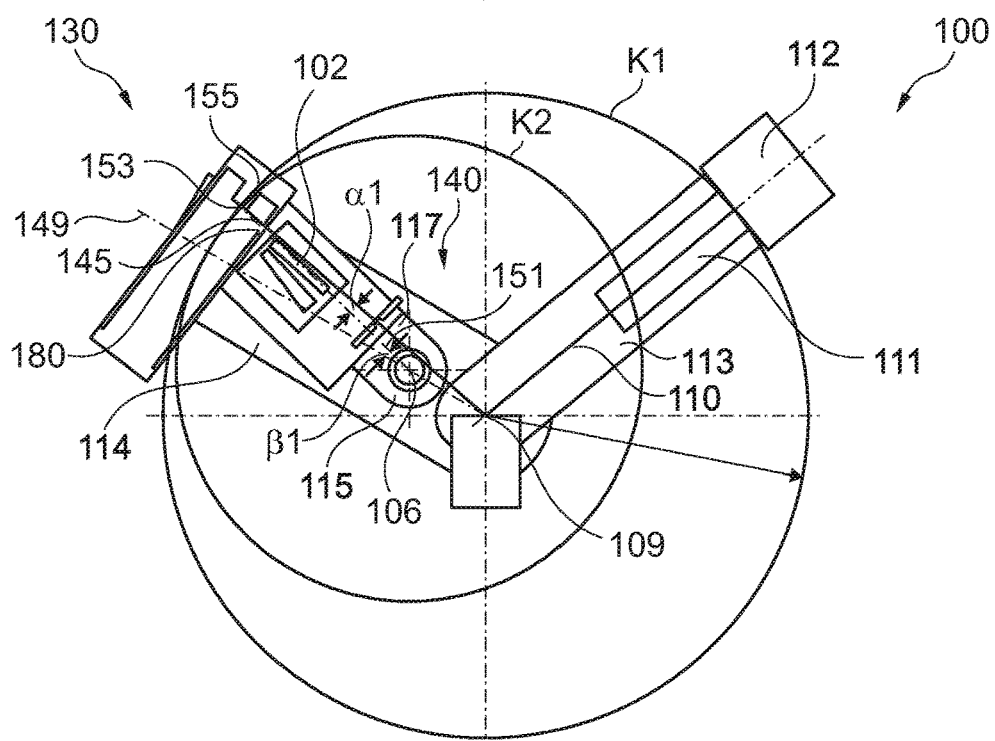
FIG. 2 schematically illustrates the device illustrated in FIG. 1 in a first configuration.
Figure 3:
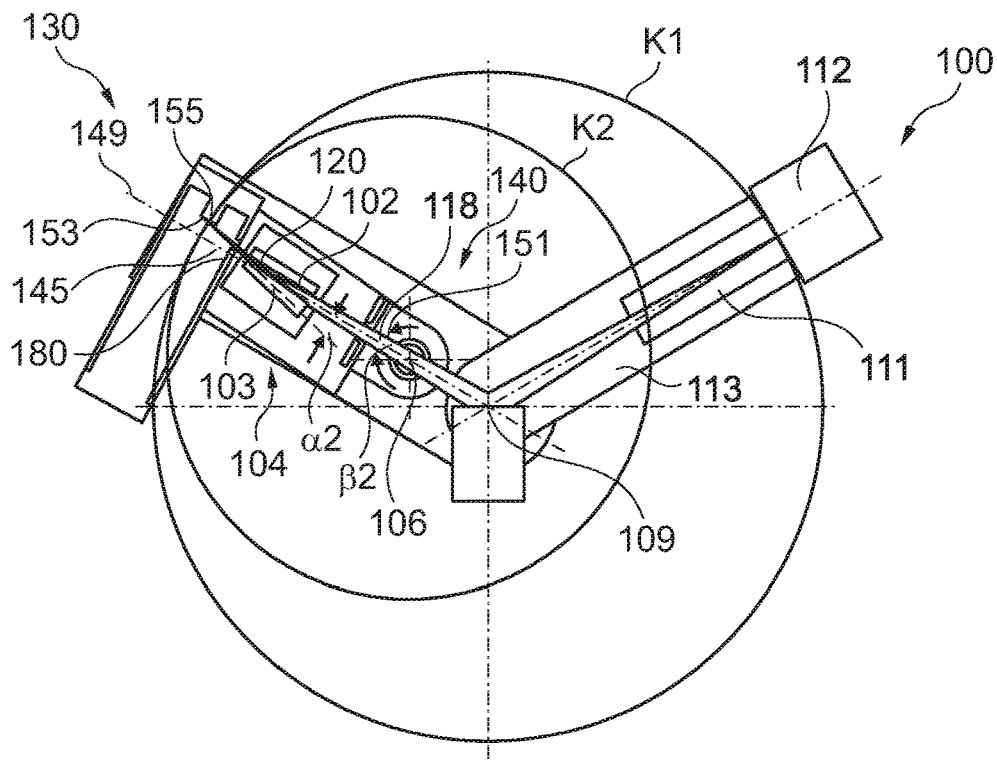
FIG. 3 schematically illustrates the device illustrated in FIG. 1 in a second constellation.

The device 100 is illustrated in FIG. 2 and FIG. 3 in two different configurations, wherein in FIG. 2 the first optics component 102 is brought into interaction with the original primary X-ray beam 145 to generate the first primary X-ray beam 117. In contrast, in FIG. 3, the second optics component 103 is brought into interaction with the original primary X-ray beam 145 to generate the second primary X-ray beam 118. However, in each case, one and the same original primary X-ray beam 145 is generated or used by bombarding a single electron target region 153 on the anode 155 of the X-ray source 101 to generate both the first primary X-ray beam 117 and the second primary X-ray beam 118.

The device 100 further comprises a controller 160 configured (through non-illustrated control lines and a processor) to adjust a rotation angle β of the rotating stage 115 depending on a traveling distance (along the arrows 159) of the optics components 102, 103 (and other optional optics components). The sample holder 108 is configured to hold the sample (not shown) in the sample region 147. In both configurations illustrated in FIGS. 2 and 3, the original primary X-ray beam 145 exits the X-ray source 101 (bounded by aperture 180) at the same optimal or desired angular range relative to the electron target region 153 on the anode 155 of the X-ray source 101 to impinge on the first and second optics components 102, 103, respectively.

Figure 4:
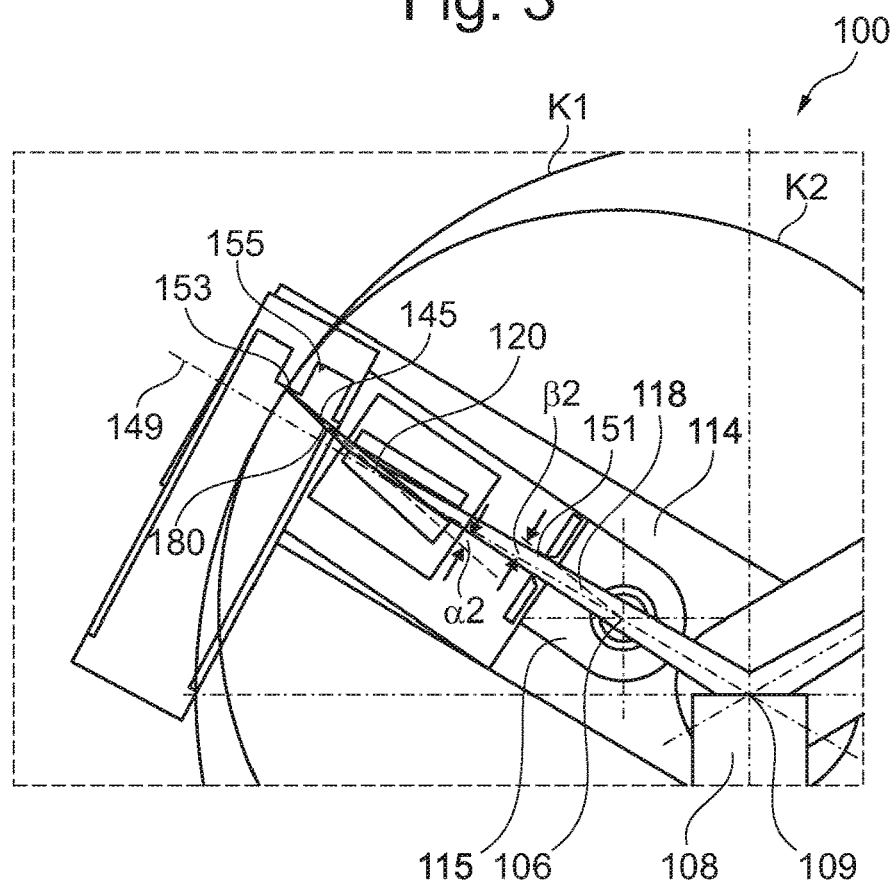
FIG. 4 illustrates a detailed section of Ha, 3.

FIG. 4 shows a detailed section of FIG. 3, illustrating both the center axis 149 of the first goniometer arm 114 and a center axis 151 of the rotating stage 114, as well as the second deflection angle α2 and also the second rotation angle β2.

Figure 5:
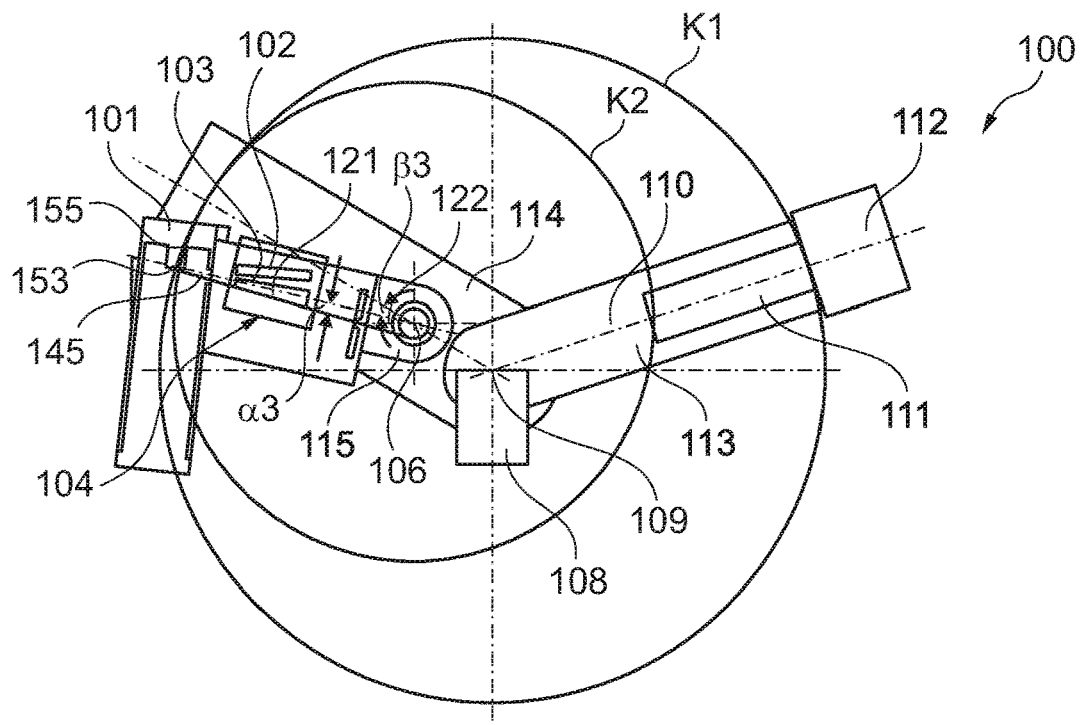
FIG. 5 schematically illustrates the device illustrated in FIG. 1 in a third constellation.

FIG. 5 illustrates the device 100 illustrated in FIG. 1 in a third constellation, wherein the second optics component 103 is moved such that the original primary X-ray beam 145 impinges the second optics component 103 from a rear side 121, whereupon a third primary X-ray beam 122 is generated, which is deflected by a third deflection angle α3 relative to the original primary X-ray beam 145 and impinges the sample. In doing so, the rotating stage 115 is rotated by a third rotation angle β3, which is unequal to the first rotation angle and the second rotation angle β1, β2.

Thus, the device 100 illustrated in FIG. 1 comprises an X-ray source 101 and further an optics system 104 (also referred to as an optics magazine or carriage) seated directly behind it and movable perpendicular to the beam path. Within this optics magazine or carriage, there are a plurality of optical components or elements. No other optical components are arranged between the X-ray source 101 and the optics magazine 104. Thus, the optics magazines are primary optics that are slidable. A rotating stage 115 (also referred to as a further goniometer arm) mounted on the actual (source side) goniometer arm 114 is rotatable about the rotating stage axis 106. This rotating stage axis 106 of the rotating stage 115 is located as close as possible to the goniometer axis 109 of the goniometer arm 114. The aperture diaphragm (also referred to as the divergence slit or adjustment slit) 105 is arranged downstream of the optics system 104. Both side elements of the divergence slit are individually controllable. Thus, both the width (aperture) and the vertical position of the slit can be varied. By vertical, a position substantially perpendicular to the beam path is meant. The optical elements of the optics system 104 may be, for example, multilayer monochromators, focusing or collimating mirrors, 1D or 2D mirrors, or single crystal optics (for example, channel cut). A combination of two or more components at one position (for example, a mirror and a monochromator) is also possible. Optionally, other optical elements may be located between the optics system 104 and the aperture diaphragm 105 (for example, Soller slits, beam limiting elements, etc.). The elements 101, 102, 103, 104, 105, 115, 116 may form a fixedly connected unit and are rotatably mounted about the rotating stage axis 106.

Alternatively, a plurality of mirrors with a plurality of different angles of inclination may be installed within the optics system. Alternatively or additionally, a single but rotatable mirror can be used, as schematically illustrated for example in FIG. 6. In this case, for example, the second optics component 203 is rotatable about an axis perpendicular to the drawing plane, for example by 180°, as indicated by the arrows 270. This allows the selection of the optimum exit angle for the X-ray source 201 at which the original primary X-ray beam 245 exits relative to the electron target region 253 of the anode 255. For example, one may adjust the angular range such that the brilliance of the original primary X-ray beam 245 is high and the intensity is low (for a small angle) or vice versa (for a large angle). According to embodiments of the present invention, a primary X-ray beam impinging on the sample may be limited, monochromatized, focused, collimated, etc. The optics system 104 or 204 can be switched through by linear displacement such that the radiation scattering above and below (the respective optics component) is covered or blocked by the other optical elements located above and below. Therefore, a movable slit or gap, as used in the conventional prior art, which was conventionally used to selectively choose one radiation path and block out another radiation path, may be omitted.

In the first configuration, which is illustrated in FIG. 2, a parallel first primary X-ray beam 117 is generated with the first optics component positioned as an X-ray mirror in the original primary X-ray beam 145 such that the reflection condition is fulfilled. The first primary X-ray beam 117 is deflected at the mirror surface of the X-ray mirror 102. This deflection angle α1 is corrected by rotating the rotating stage 115 by the first rotation angle β1 to direct the first primary X-ray beam 117 as closely as possible to the goniometer axis 109 or to the sample (not shown).

In the second configuration illustrated in FIG. 3, the second primary X-ray beam 118 is generated by reflection of the original primary X-ray beam 145 at (from) a planar X-ray mirror 103 (more specifically, at the mirror surface 120 of the planar multilayer mirror 103). Therefore, the second primary X-ray beam 118 has the same divergence as the original primary X-ray beam 145, allowing measurement with Bragg-Brentano geometry. In this case, the electron target region 153 of the anode 155 of the X-ray source 101 should be located as exactly as possible on the radius r of the diffractometer (formed by the distance of the goniometer axis 109 of the diffractometer to the electron target region 153 of the anode 155), that is, on the circle K1. The radius 1 of the circle K2 showing the locations of the electron target region 153 when the rotating stage 115 rotates should be as large as possible, for example ⅔ of the distance r. Thus, the distance from the focal spot 153 on the anode 155 to the goniometer axis 109 changes only minimally, despite angular correction, since the two circles K1, K2 are tangent to each other and also do not have very different radii (r, l). In contrast, in the prior art, a linear displacement is performed, but this results in a larger deviation from the Bragg-Brentano geometry than it is made possible by embodiments of the present invention.

In the third configuration, which is illustrated in FIG. 5, a focusing third primary X-ray beam 122 is generated by interaction of the original primary X-ray beam 145 with the rear side 121 of the second optics component 103. The X-ray mirrors or monochromators of the optics system 104 may be designed and arranged to select the optimum exit angle of the original primary X-ray beam 145 to the anode of the X-ray source. The focal spot (electron target region) 153 on the anode 155 of the X-ray source 101 has a certain spatial extent. If the take-off angle (exit angle) is very small, then the projected area of the focal spot decreases, which is why the beam becomes more brilliant. However, the intensity decreases.

Figure 6:
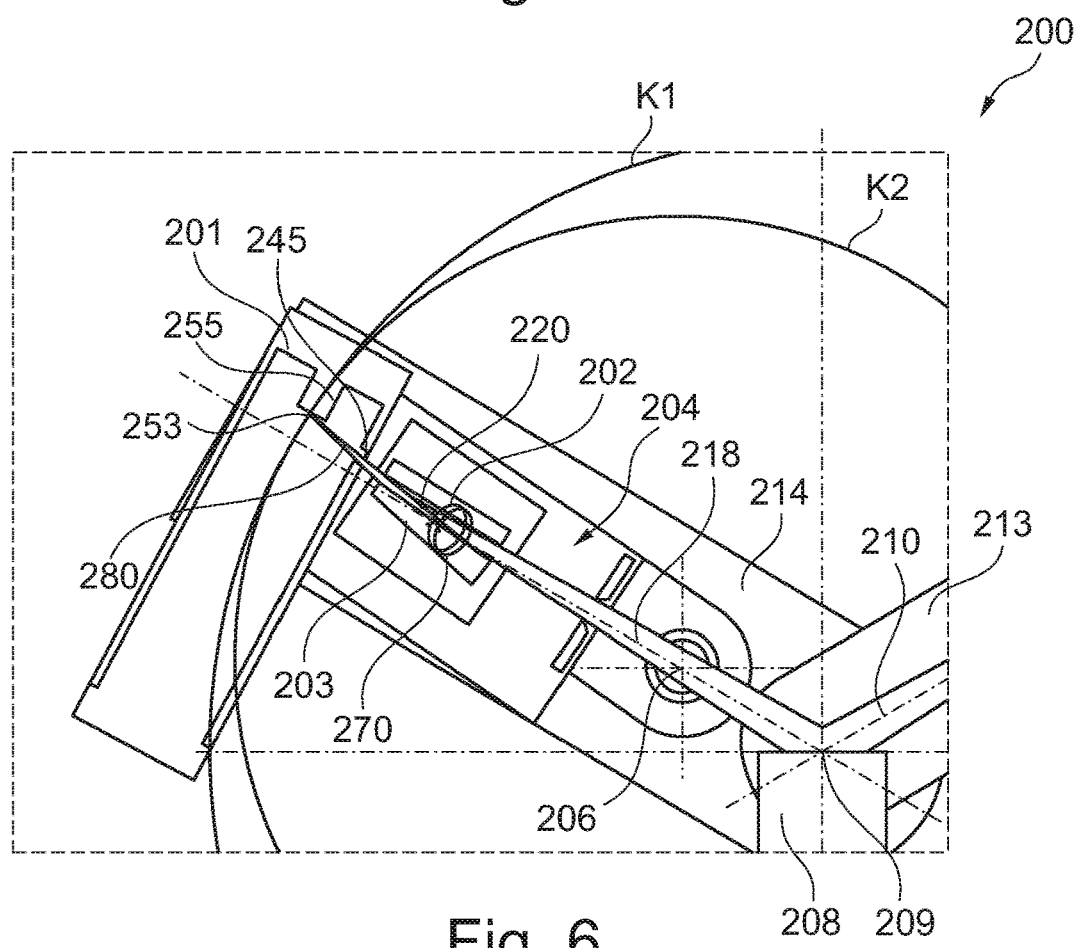
FIG. 6 schematically illustrates a device for X-ray examination according to a further embodiment of the present invention.

Alternatively, or in addition to a plurality of optics components within the optics system 104, a rotatable mirror 203 may be used, as illustrated in FIG. 6. By doing so, an exit angle may be selected that is optimal for the X-ray source. For example, by rotating along arrows 270, the mirror 203 may be rotated such that a second primary X-ray beam 218 has a high brilliance but a low intensity (at a small angle) or vice versa (at a large angle).

In accordance with embodiments of the present invention, the exit angle of the original primary X-ray beam 145 relative to the anode or the electron target region may be selected as desired to achieve an optimum intensity and/or an optimum brilliance. The optical elements 102, 103 (and optionally other optical elements) may be incorporated or arranged within the optics system 104 such that they are always struck by a desired original primary X-ray beam from a desired or optimal exit angle range. However, depending on the optical element selected, or even depending on the wavelength or energy of the primary X-ray beam, this has the effect of variation of the exit angles of the various optical elements, that is, the directions of the X-rays generated by interaction with the optical elements, To compensate for this variation in the exit direction, the rotating stage 115 is suitably rotated in order to allow the generated primary X-ray beam to impinge on the sample. In accordance with embodiments of the invention, the rotating stage axis 106 is located as close as possible to the goniometer center or goniometer axis 109 of the goniometer arm 114. Therefore, when the rotating stage 115 is rotated, the distance between the X-ray source 101 and the goniometer axis 109 changes to a lesser extent than when it is moved linearly, as it has been conventionally done. Thus, a very flexible diffractometer is provided, and all process steps may be fully automated.

Optionally, an optics 111 may be arranged upstream of the detector 112. By diffraction of the respective primary X-ray beam, secondary radiation 110 emanates from the sample, which is detected by the detector 112 (and optionally passes through the optics 111).

Figure 7:
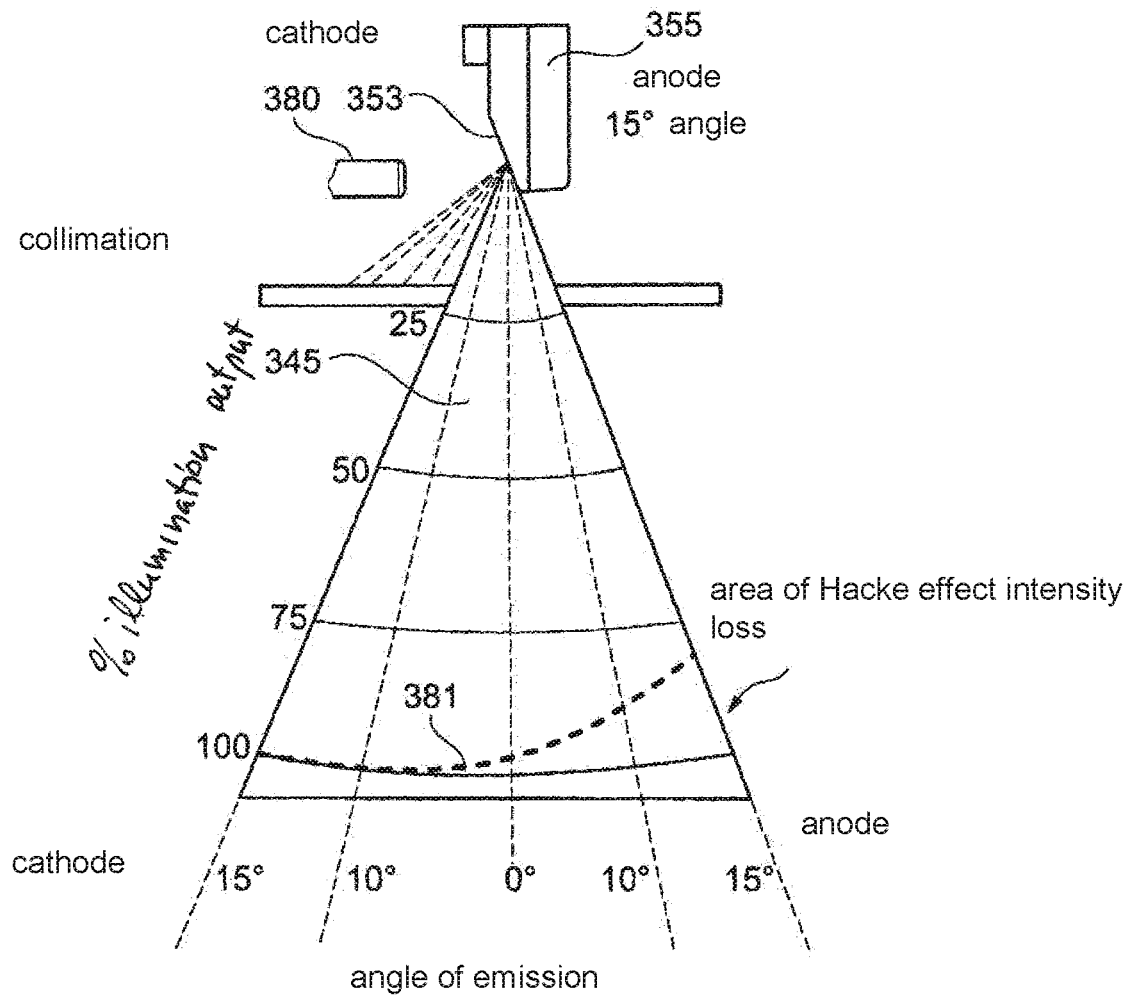
FIG. 7 illustrates the intensity of original primary X-rays as a function of an exit angle.

FIG. 7 exemplarily illustrates an anode 355 having an electron target region 353. Bombardment of the electron target region 353 with electrons emitted from a cathode 380 generates original primary X-ray radiation 345. The intensity of the original primary X-ray radiation 345 varies with the exit angle according to the curve 381. Embodiments of the present invention enable an adjustment of optics components such that a desired intensity and desired brilliance of the original primary X-ray beam 345 interacts with a desired optics component to generate a corresponding primary X-ray beam of desired characteristics that subsequently impinges on the sample.

The invention claimed is:

1. A device for X-ray examination of a sample, the device comprising:
   an X-ray beam generating system, comprising:
      an X-ray source for generating an original primary X-ray beam;
      an optics system comprising a first optics component and at least one second optics component which are movable relative to the X-ray source in order either
         to bring the first optics component into interaction with the original primary X-ray beam, whereupon a first primary X-ray beam is generated which is deflected at a first deflection angle, or
      to bring the second optics component into interaction with the original primary X-ray beam, whereupon a second primary X-ray beam is generated which is deflected at a second deflection angle; and
   a rotating device having a rotating stage on which the X-ray beam generating system is mounted in order to rotate the X-ray beam generating system through either a first rotation angle or a second rotation angle about a rotating stage axis in order to allow either the first primary X-ray beam or the second primary X-ray beam to impinge on a sample region.

2. The device according to claim 1, wherein the rotating stage axis is parallel to a goniometer axis, and wherein the sample region is located at the goniometer axis.

3. The device according to claim 1, wherein the rotating stage axis is arranged offset from the goniometer axis.

4. The device according to claim 1, wherein a distance between the X-ray source and the rotating stage axis is between 0.5 and 0.9 times a distance between the goniometer axis and the X-ray source.

5. The device according to claim 1, wherein a deflection axis about which the first primary X-ray beam or the second primary X-ray beam is deflected relative to the original primary X-ray beam by the first deflection angle and the second deflection angle, respectively, is parallel to the rotating stage axis.

6. The device according to claim 1, further comprising:
   an X-ray detector;
   a goniometer having a first arm and a second arm, the first arm and/or the second arm being pivotable about the goniometer axis, the first arm having mounted thereon the rotating stage having the X-ray beam generating system, and the second arm having mounted thereon the X-ray detector.

7. The device according to claim 1, wherein at least one of the optics components is configured to generate from the original primary X-ray beam a monochromatic or polychromatic primary X-ray beam that is parallel or divergent or focusing collimating.

8. The device according to claim 1, wherein at least one of the optics components comprises one or more of the following components:
- a collimating X-ray mirror,
- a focusing X-ray mirror,
- a multilayer X-ray mirror,
- a multilayer monochromator,
- a single crystal optics,
- a 1D mirror,
- a 2D mirror.

9. The device according to claim 1, wherein the optics components are linearly movable relative to the X-ray source substantially perpendicular to the original primary X-ray beam.

10. The device according to claim 1, wherein the optics system comprises a carriage mounted on the rotating stage and displaceable relative to the X-ray source, on which carriage the optics components are mounted.

11. The device according to claim 1, wherein the first optics component and the second optics component are selectively movable such that the original primary X-ray beam exits the X-ray source and impinges on the first optics component and the second optics component, respectively, in each case at the same optimal or desired angular range relative to an electron target region on the anode of the X-ray source.

12. The device according to claim 1, wherein at least one of the optics components is rotatable about an optics rotation axis parallel to the rotating stage axis.

13. The device according to claim 1, wherein the original primary X-ray beam is not deflected after exiting the X-ray source and before entering the optics system.

14. The device according to claim 1, further comprising:
an aperture diaphragm, substantially perpendicular to the first and/or second primary X-ray beam, variable with respect to aperture position and/or aperture size, being mounted downstream of the optics system on the rotating stage.

15. The device according to claim 1, wherein the original primary X-ray beam is generated by bombarding a single electron target region on an anode of the X-ray source in order to generate both the first primary X-ray beam and the second primary X-ray beam from the original primary X-ray beam when the first optics component and the second optics component, respectively, is struck by the original primary X-ray beam.

16. The device according to claim 1, wherein the X-ray source, the X-ray detector and the sample region are arranged substantially in Bragg-Brentano geometry.

17. The device according to claim 1, further comprising:
a controller configured to adjust a rotation angle of the rotating stage depending on a traveling distance of the optics components.

18. The device according to claim 1, further comprising:
a sample holder configured to hold the sample in the sample region.

19. A method of X-ray examination of a sample, the method comprising:
generating an original primary X-ray beam by means of an X-ray source of an X-ray beam generating system further comprising an optics system having a first optics component and at least one second optics component which are movable relative to the X-ray source;
bringing the first optics component of the optics system into interaction with the original primary x-ray beam to generate a first primary x-ray beam deflected at a first deflection angle, wherein a rotating device includes a rotating stage on which the x-ray beam generating system is mounted and which is adjusted at a first rotation angle to allow the first primary x-ray beam to impinge on a sample region;
further comprising:
moving the first optics component and the second optics component of the optics system relative to the X-ray source to bring the second optics component into interaction with the original primary X-ray beam to generate a second primary X-ray beam deflected at a second deflection angle; and
rotating the rotating stage to a second rotation angle about a rotating stage axis to allow the second primary x-ray beam to impinge on the sample region.

\* \* \* \* \*